US012320723B2

(12) United States Patent
Naegele et al.

(10) Patent No.: US 12,320,723 B2
(45) Date of Patent: Jun. 3, 2025

(54) APPARATUS FOR MEASUREMENT OF CAPILLARY PRESSURE IN A POROUS SAMPLE

(71) Applicant: AMETEK, INC., Berwyn, PA (US)

(72) Inventors: Phillip Naegele, Claremore, OK (US); William J. Willems, Broken Arrow, OK (US); Tom Hicks, Tulsa, OK (US)

(73) Assignee: AMETEK, INC., Berwyn, PA (US)

( * ) Notice: Subject to any disclaimer, the term of this patent is extended or adjusted under 35 U.S.C. 154(b) by 182 days.

(21) Appl. No.: 18/129,266

(22) Filed: Mar. 31, 2023

(65) Prior Publication Data

US 2024/0328880 A1    Oct. 3, 2024

(51) Int. Cl.
*G01L 7/18*    (2006.01)

(52) U.S. Cl.
CPC .................. *G01L 7/187* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12;
(Continued)

(56) References Cited

U.S. PATENT DOCUMENTS

| 4,740,077 A | 4/1988 | Goodwill |
| 6,185,985 B1 * | 2/2001 | Fleury ................ G01N 15/082 73/38 |

(Continued)

FOREIGN PATENT DOCUMENTS

| ES | 0106398 A2 * | 4/1984 | |
| ES | 2927095 T3 * | 11/2022 | ......... B01F 13/0079 |

OTHER PUBLICATIONS

International Search Report and Written Opinion for International Application No. PCT/US2024/021942, dated Jun. 24, 2024 (24-1062024)—12 pages.

(Continued)

*Primary Examiner* — Andre J Allen
(74) *Attorney, Agent, or Firm* — CM Law; Stephen J. Weed (57) ABSTRACT

A capillary pressure measurement device includes a centrifuge having a rotating apparatus adapted to hold porous media samples and to test the samples under centrifugal motion during rotation of the rotating apparatus. A fluid capture device disposed adjacent to each porous media sample receives fluid displaced from the sample due to centrifugal motion applied to the sample during rotation. A measurement system measures an amount of fluid displaced from the porous media samples by taking an image of a fluid meniscus in the fluid capture device. A position sensor determines a position of the fluid capture device and triggers a camera to take the image of the fluid meniscus when the fluid meniscus is in a field of view of the camera. The image of the fluid meniscus is processed to determine a fluid volume correlated to capillary pressure of the corresponding porous media sample.

10 Claims, 5 Drawing Sheets

(58) Field of Classification Search
CPC ... G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 9/0025; G01L 7/08; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; G01N 15/082; G01N 15/088; G01N 33/204
USPC ................................................ 73/700–756
See application file for complete search history.

(56) References Cited

U.S. PATENT DOCUMENTS

| | | | |
|---|---|---|---|
| 7,352,179 B2* | 4/2008 | Chen | G01N 24/08 |
| | | | 324/303 |
| 2022/0168754 A1 | 6/2022 | Ramsay et al. | |
| 2024/0331143 A1* | 10/2024 | Naegele | G06T 7/70 |

OTHER PUBLICATIONS

Jong-Myeon Park et al: "Multifunctional microvalves control by optical illumination on nanoheaters and its application in centrifugal microfluidic devices", Lab On a Chip, Royal Society of Chemistry, Uk, vol. 7, Feb. 15, 2007 (Feb. 15, 2007), pp. 557-564, XP007902269.
Mayes, Melanie et al., "Comparison of Average and Point Capillary Pressure—Saturation Functions Determined by Steady-State Centrifugation," Soil Science Society of America Journal, vol. 75, No. 1, Jan. 2010, 10 pages.
Shen Teng et al: "Analysis and experiment of transient filling flow into a rectangular microchannel on a rotating disk", Microfluidics (56) References Cited

OTHER PUBLICATIONS and Nanofluidics, Springer Berlin Heidelberg, Berlin/Heidelberg, vol. 20 No. 4, Mar. 14, 2016 (Mar. 14, 2016) pp. 1-12, XP035645575.

* cited by examiner

FIG. 4

APPARATUS FOR MEASUREMENT OF CAPILLARY PRESSURE IN A POROUS SAMPLE

TECHNICAL FIELD

The present subject matter relates to an apparatus and method for determining the capillary pressure of porous media formations.

BACKGROUND

Capillary pressure is an inherent property of porous media formations. To determine capillary pressure, samples are contained in a holder, and the holder is attached to rotating apparatus within a centrifuge. The centrifuge spins the samples at a high speed, and the centrifugal force displaces fluid from the sample that is captured in a measuring cup. The amount of fluid captured over time is measured and directly correlated to capillary pressure. Conventional centrifuges apply increasing centrifugal force for the displacement of liquid from saturated samples by developing pressure differences at the interface of two immiscible fluids. The produced liquid interface position in the fluid measurement holder may be determined and recorded using a computer controlled camera.

For example, US 2022/0168754 describes a centrifuge for analysis of core samples. The centrifuge includes a rotating arm and a holder coupled to a distal end of the rotating arm where the holder is configured to rotate independently of the rotating arm for analyzing fluid-rock interaction within the holder. However, no means for measurement of porous sample saturation is described.

As another example, U.S. Pat. No. 7,352,179 describes a device for measuring capillary pressure in a sample including a centrifuge in which the sample is mounted such that different portions of the sample are spaced at different distances from the axis of the centrifuge. As the sample is rotated about the axis of the centrifuge, a first parameter (e.g., relative saturation) is measured in different parts of the sample and a value of a second parameter (e.g., capillary pressure) is determined that is related to the force to which each portion is subject due to rotation of the sample. The capillary pressure curve obtained with air and water is converted to a capillary pressure curve under mercury intrusion and is also measured by use of the centrifuge with magnetic resonance imaging.

BRIEF DESCRIPTION OF THE DRAWINGS

The drawing figures depict one or more implementations, by way of example only, not by way of limitations. In the figures, like reference numerals refer to the same or similar elements. Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

A capillary pressure measurement device includes a centrifuge having a rotating apparatus adapted to hold a porous media sample and to test the sample under centrifugal motion during rotation of the rotating apparatus. A fluid capture device disposed adjacent to the core sample receives fluid displaced from the core sample due to centrifugal motion applied to the core sample during rotation. A measurement system measures an amount of fluid displaced from the core sample by taking an image of a fluid meniscus in the fluid capture device. A position sensor determines a position of the fluid capture device and triggers a camera to take the image of the fluid meniscus when the fluid meniscus is in a field of view of the camera. The image of the fluid meniscus is processed to determine a fluid volume correlated to capillary pressure of the core sample.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

Conventional centrifuges also use a camera system to monitor the fluid volume in the fluid capture device. However, a strobe is conventionally used to fix the position of the sample holder in time within a viewing window so that an image can be taken with the camera. The strobe has to be adjusted manually in order to position each sample holder within the viewing window so that an image can be taken of the fluid meniscus of the fluid in the fluid capture device (e.g., measuring cup) for each sample holder. Also, the strobe has been shown to fail frequently due to the high cycle rate of the bulbs which can result in loss of data during a test. In sample configurations described herein, the strobe is eliminated in favor of a position sensor that detects the location of the rotating apparatus and signals the high speed camera for an image capture in time, thus automating the image capture process and eliminating the strobe light.

It is also desirable to have measuring cups with different volume capacities. It is further desirable to maximize the size and number of samples tested at one time to maximize test results. However, the number and size of samples tested at one time is limited by the size of the centrifuge. In addition, due to the differing properties of the samples, multiple configurations of fluid capture containers are typically used for both drainage and imbibition tests.

Conventionally, different measuring cups with different volume capacities are used. The sample holders described herein accommodate samples of different sizes and configurations in the same measuring cups.

The configurations described in the examples illustrated in the accompanying drawings and discussed below address these limitations in the art.

Figure 1A:
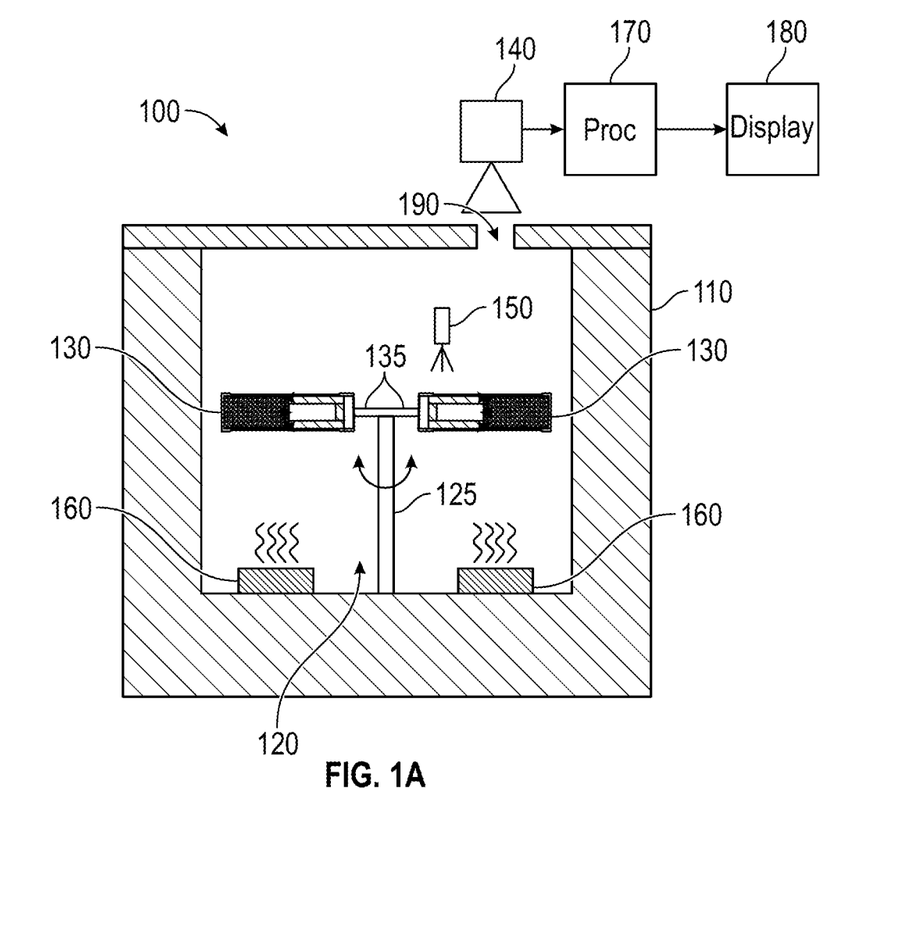
FIG. 1A is a side-sectional view of a sample configuration of an apparatus for measuring capillary pressure in a porous sample.
Figure 1B:
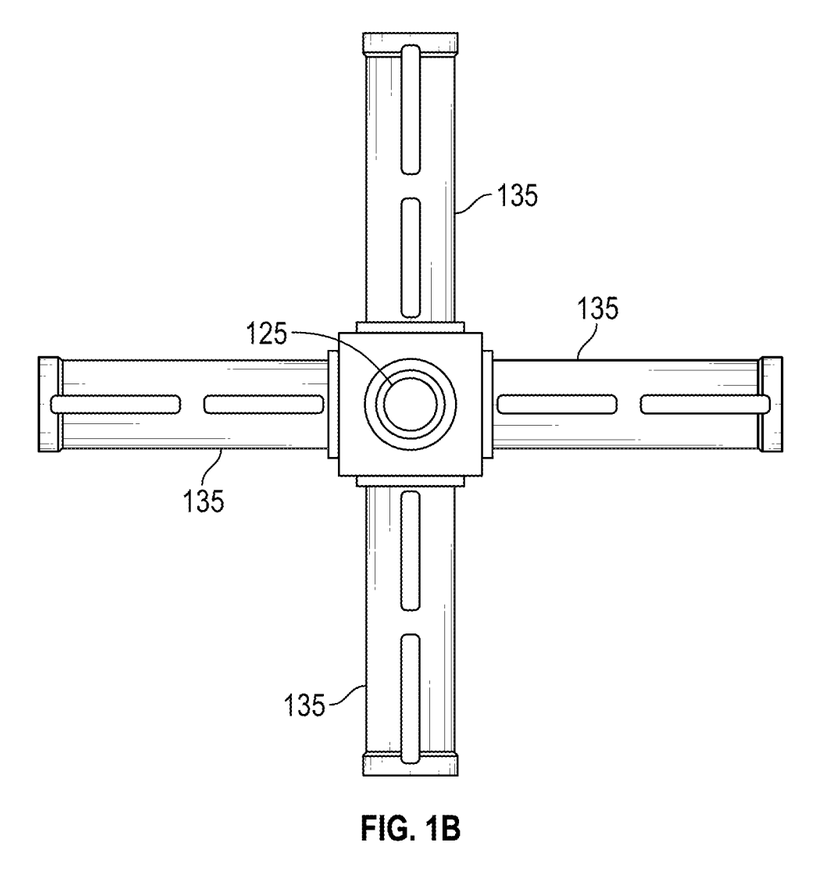
FIG. 1B is a top view of the rotating apparatus of the configuration of FIG. 1A, better illustrating the arms for a configuration having 4 arms.

FIG. 1A is a side-sectional view of a sample configuration of an apparatus 100 for measuring capillary pressure in a porous media sample. As illustrated in FIG. 1A, the primary components of the apparatus 100 include a centrifuge 110, a rotating apparatus 120 including a sample holder 130, and a camera system 140. The rotating apparatus 120 has one or more arms 135 adapted to hold a porous media sample (e.g., in a cylindrical shape) in one or more sample holders 130. FIG. 1B is a top view of the rotating apparatus 120, which better illustrates arms 135 for a configuration having 4 arms 135. Typically, the sample is placed in the sample holder 130, which is on an arm 135 of the rotating apparatus 120. The sample holder 130 with the porous media sample is secured in the rotating apparatus 120 of the centrifuge 110 and rotated at a high speed. Over time, fluid is displaced from the porous media sample 130 and collected in a fluid capture device such as a measuring cup 230 (FIG. 2A) of the sample holder 130.

The sample holder 130 is fixed to the rotor 125 of the rotating apparatus 120, which spins the sample holder 130 at a specified speed. A position sensor 150 detects the location of the sample holder 130 and signals the camera 140 to take an image of the sample holder 130. Heaters 160 may be used to heat the sample holder 130. In sample configurations, images from the camera 140 are processed by an image processing device 170 for display on an optional display 180.

Figure 2A:
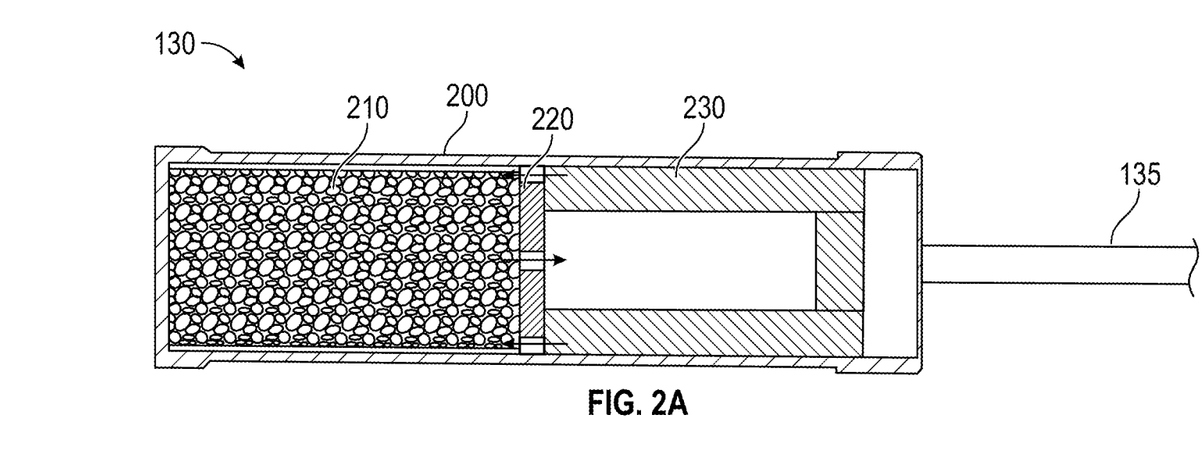
FIG. 2A is a side-sectional view of a sample holder in an imbibition configuration.

FIG. 2A is a side-sectional view of the sample holder 130 in an imbibition configuration. As illustrated, the sample holder 130 is comprised of a housing 200, a porous media sample 210, a flow distribution plug 220, and a measuring cup 230. In the imbibition configuration of FIG. 2, the porous media sample 210 is placed in the housing 200 at a position which is the furthest away from the center of rotation of the rotor 125. The flow distribution plug 220 is placed next to the porous media sample 210 and then the measuring cup 230 is placed next to the flow distribution plug 220 as illustrated. In the imbibition configuration, the porous media sample 210 is saturated with a fluid of known density, and the measuring cup 230 is placed in front of the sample 210 (i.e., in a circumferentially inward position) and filled with a fluid of known density, which has a fluid density greater than that in the porous media sample. As the sample holder 130 rotates in the centrifuge 110, centrifugal force creates a pressure imbalance in the porous media sample 210. Fluid in the measuring cup 230 begins to displace fluid in the sample 210 and the fluid in the sample 210 collects in the measuring cup 230. In a sample configuration, the flow distribution plug 220 is designed to direct fluid flow from the measuring cup 230 to the extremities of the porous media sample 210, and the fluid from the interior of the porous media sample 210 into the measuring cup 230.

Figure 3A:
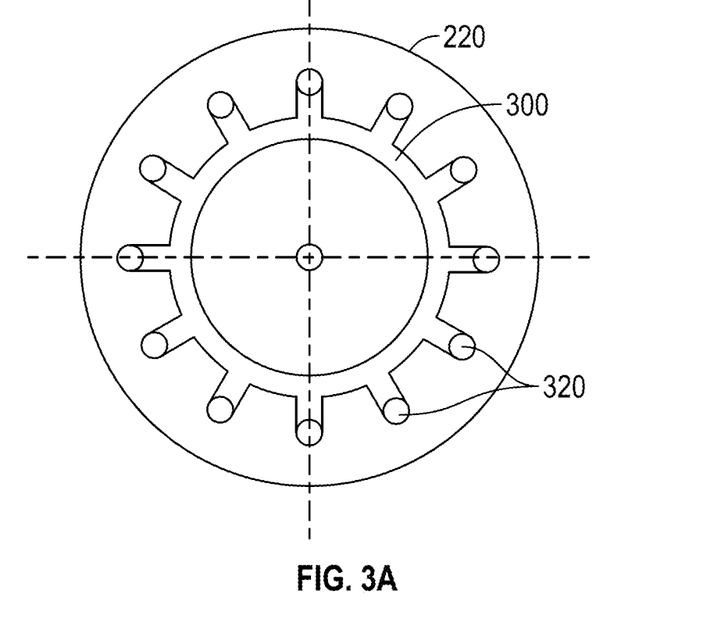
FIG. 3A illustrates a side of the flow distribution plug adjacent the measuring cup.
Figure 3B:
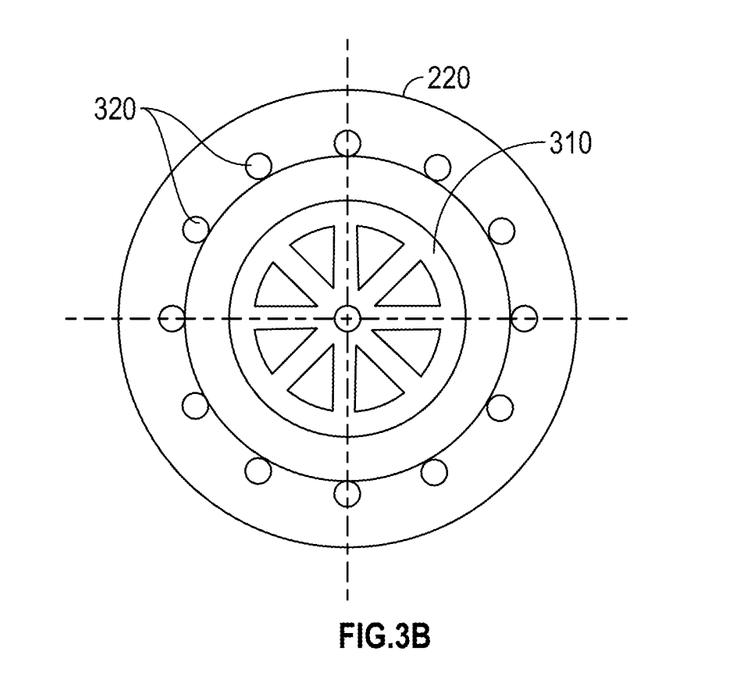
FIG. 3B illustrates a side of the flow distribution plug adjacent the sample.

As shown in FIGS. 3A and 3B, the flow distribution plug 220 is designed with a configuration of channels 300 and 310 and holes 320 for managing flow. As illustrated in FIG. 3A, the channels 300 on the side of the flow distribution plug 220 adjacent the measuring cup 230 function to guide the fluid from the side of the flow distribution plug 220 on the side of the measuring cup into the holes 320 for flow in the channels 310 on the side of the flow distribution plug 220 adjacent the side sample 210 for flow around the periphery of the flow distribution plug 220.

The camera system 140 in FIG. 1A is used to monitor the amount of fluid collected in the measuring cup 230 from the porous media sample 210 over time. To monitor the fluid collected, the housing of the centrifuge 110 contains a slot 190 machined into the side of the housing of the centrifuge 110, and the measuring cup 230 is opaque in construction to enable viewing of the fluid in the measuring cup 230. During testing, it is also desirable to heat the apparatus using heaters 160 to simulate the effects of temperature on the measurement.

Figure 2B:
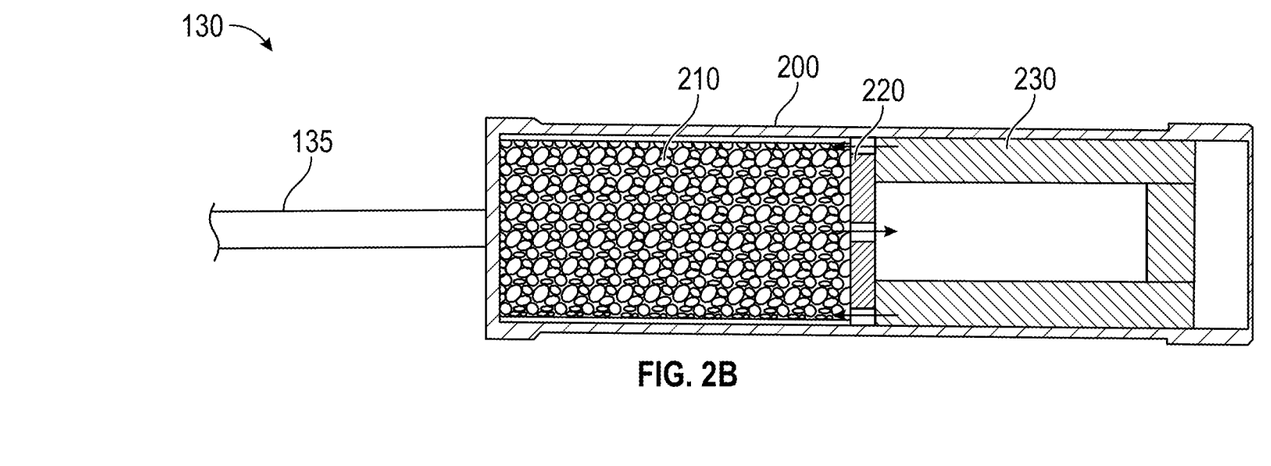
FIG. 2B is a side-sectional view of the sample holder of FIG. 2A in a drainage configuration.

FIG. 2B is a side-sectional view of the sample holder 130 in a drainage configuration. In the drainage configuration, the positions of the porous media sample 210 and the measuring cup 230 are exchanged. In this case, the measuring cup 230 is farthest away from the center of rotation of the rotor 125, and the porous media sample 210 is closer to the center of rotation. The porous media sample 210 is saturated with the higher density fluid, and the measuring cup 230 contains the lower density fluid. As the sample holder 130 rotates, the fluid is extracted from the porous media sample 210, passes through the flow distribution plug 220, and collects in the measuring cup 230 due to the centrifugal force.

Figure 4:
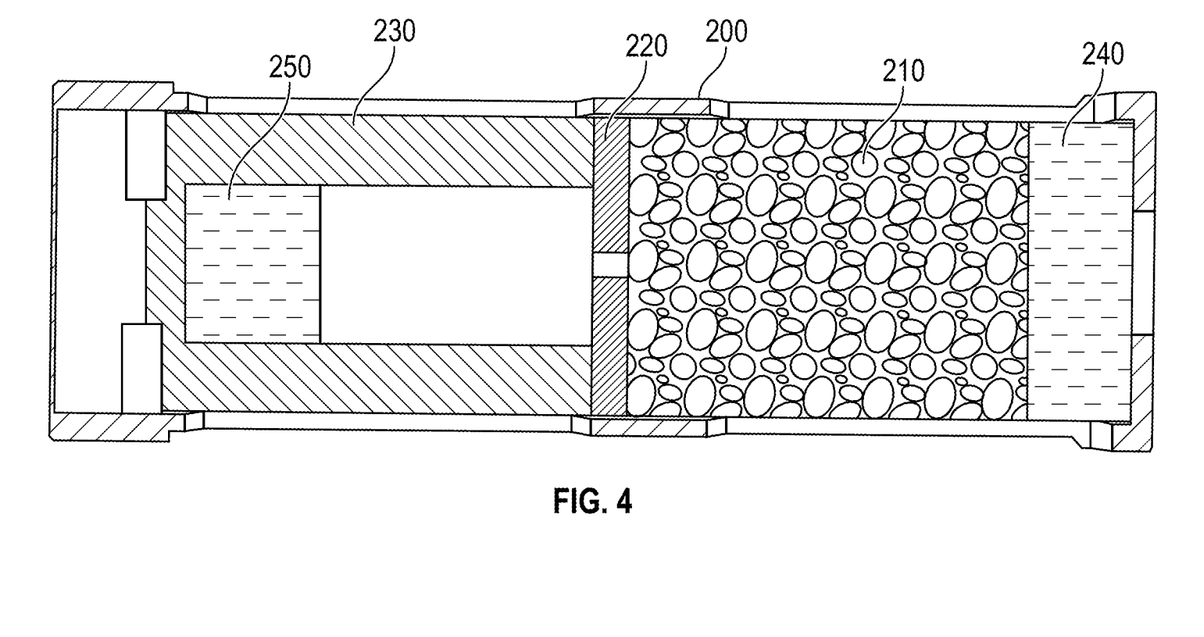
FIG. 4 illustrates modification of a single measuring cup to include solid spacers to reduce the volume capacity as needed to accommodate samples of different sizes or configurations.

Conventional centrifuges use different constructions of the sample holder to conduct the imbibition and drainage tests. In the configuration of FIG. 1A, the rotating apparatus 120 is configured to allow the same sample holder 130 to be used in all test configurations to simplify the complexity of the centrifuge 110. In particular, the rotating apparatus 120 is adapted to simultaneously receive porous media samples of variable sizes and configurations. For example, in a sample configuration, a single measuring cup 230 may be used by adding solid spacers 240 and 250 to the measuring cup 230 as shown in FIG. 4 to reduce the volume capacity as needed to accommodate samples of different sizes or configurations. This simplified construction of the centrifuge 110 allows an increase in the number and size of samples that may be tested simultaneously, thereby improving efficiency.

Also, in a first sample configuration, the position sensor 150 detects the location of the rotating apparatus 120 and signals the digital camera 140 to capture the image at the appropriate time, thus eliminating the need for a strobe light. In particular, the position sensor 150 detects when the measuring cup 230 passes over or under the position sensor 150 and triggers the digital camera 140 to immediately capture an image of a fluid meniscus of the measuring cup 230 when the fluid meniscus is in a field of view of the digital camera 140. The position sensor 150 may be connected to the digital camera 140 by wired or wireless connection. The image processing device 170 processes the captured images to determine the fluid volume in the measuring cup 230. The image processing device 170 may further calculate the capillary pressure as a function of the measured fluid volume and may optionally output the calculated capillary pressure to a display 180.

Conversely, in a second sample configuration, the position sensor 150 may detect a particular indicia of the rotating apparatus 120 and trigger the digital camera 140 to capture an image at a time thereafter that is a function of the speed of rotation of the rotating apparatus 120 and the distance of the indicia from the fluid meniscus in the sample holder 230. The image processing device 170 processes the images and determines the capillary pressure in the same fashion as in the first sample configuration.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g., approximate, substantially, or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A capillary pressure measurement device, comprising:
   a centrifuge comprising a rotating apparatus adapted to hold a plurality of porous media samples and configured to test the porous media samples under centrifugal motion during rotation of the rotating apparatus;
   a fluid capture device disposed adjacent to each of the porous media samples during rotation for receiving fluid displaced from the respective porous media samples due to centrifugal motion applied to the respective porous media samples by rotation of the rotating apparatus, the fluid capture device including one or more solid spacers to reduce a volume of the fluid capture device for different porous media sample configurations;
   a measurement system that measures an amount of fluid displaced from each of the porous media samples, the measurement system including a camera that takes an image of a fluid meniscus in the respective fluid capture devices and a position sensor that determines a position of the respective fluid capture devices and triggers the camera to take the image of each fluid meniscus when the fluid meniscus is in a field of view of the camera, wherein each fluid meniscus represents a fluid volume that is correlated to capillary pressure of a corresponding porous media sample.

2. The capillary pressure measurement device of claim 1, wherein the position sensor detects when the respective fluid capture devices pass over or under the position sensor and triggers the camera to immediately capture the image of the corresponding fluid meniscus.

3. The capillary pressure measurement device of claim 1, wherein the position sensor detects an indicia of the rotating apparatus and triggers the camera to capture the image of the fluid meniscus of each fluid capture device at a time thereafter that is a function of a speed of rotation of the rotating apparatus and a distance of the indicia from the fluid meniscus.

4. The capillary pressure measurement device of claim 1, further comprising an image processing device that processes images captured by the camera to determine the fluid volume in the respective fluid capture devices.

5. The capillary pressure measurement device of claim 4, wherein the image processing device further calculates capillary pressures of the respective porous media samples as a function of the determined fluid volumes and outputs the respective calculated capillary pressures to a display.

6. A capillary pressure measurement method, comprising:
   placing a plurality of porous media samples of variable sizes and configurations in a rotating apparatus of a centrifuge, wherein the rotating apparatus is configured to test the respective porous media samples under centrifugal motion during rotation of the rotating apparatus;
   receiving, in a fluid capture device disposed adjacent to each of the porous media samples during rotation, fluid displaced from each porous media sample due to centrifugal motion applied to the respective porous media samples by rotation of the rotating apparatus, wherein a volume of the fluid capture device for different porous media sample configurations is reduced by adding one or more solid spacers to the fluid capture device for the different porous media sample configurations;
   determining a position of the respective fluid capture devices using a position sensor;
   triggering a camera to take an image of a fluid meniscus in the respective fluid capture devices when each fluid meniscus is in a field of view of the camera; and
   determining an amount of fluid displaced from each of the porous media samples from the images of each respective fluid meniscus, wherein each respective fluid meniscus represents a fluid volume that is correlated to capillary pressure of the respective porous media samples.

7. The capillary pressure measurement method of claim 6, wherein determining the position of the respective fluid capture devices comprises the position sensor detecting when the respective fluid capture devices pass over or under the position sensor and triggering the camera comprises triggering the camera to immediately capture the image of each fluid meniscus when the respective fluid capture devices pass over or under the position sensor.

8. The capillary pressure measurement method of claim 6, wherein determining the position of the respective fluid capture devices comprises the position sensor detecting an indicia of the rotating apparatus and triggering the camera comprises triggering the camera to capture the image of each fluid meniscus at a time after detecting the indicia that is a function of a speed of rotation of the rotating apparatus and a distance of the indicia from the respective fluid meniscus.

9. The capillary pressure measurement method of claim 6, wherein determining the amount of fluid displaced from the respective porous media samples from the images of the fluid meniscus comprises processing images captured by the camera to determine the fluid volume in the respective fluid capture devices.

10. The capillary pressure measurement method of claim 9, further comprising calculating capillary pressures of each of the porous media samples as a function of the determined respective fluid volumes and outputting the respective calculated capillary pressures to a display.

\* \* \* \* \*